3,184,433
STABILIZED CRYSTALLINE POLYALDEHYDES HAVING 2–10 CARBON ATOMS PER MONOMER UNIT
Otto Franz Leopold Vogl, Wilmington, Del., assignor to E. I. du Pont de Nemours and Company, Wilmington, Del., a corporation of Delaware
No Drawing. Filed Aug. 26, 1959, Ser. No. 836,070
4 Claims. (Cl. 260—67)

This invention relates to stabilized crystalline polyaldehydes, and, more particularly, it relates to stabilized crystalline polyaldehydes, and processes of preparing them, in which the aldehyde monomer unit has 2–10 carbon atoms.

In my copending patent application Serial Number 755,415, filed August 18, 1958, now abandoned, there are described and claimed as novel compositions of matter crystalline polyaldehydes having 2–10 carbon atoms per monomer unit. These polymers are highly useful as thermoplastic materials, but, in an unmodified state, they lack the high degree of thermal stability which is desirable for many specialized uses of plastics and for certain methods of fabrication.

It is an object of this invention to provide as novel compositions of matter thermally stabilized crystalline polyaldehydes having 2–10 carbon atoms per monomer unit. It is another object of this invention to provide a crystalline, thermoplastic polymer of an aldehyde having 2–10 carbon atoms per monomer unit, each of the two ends of the polymer chain being terminated by an ester group or an ether group. It is still another object of this invention to provide a process for preparing an esterified or an etherified crystalline polyaldehyde. Other objects will appear in the more detailed description of this invention which follows.

The above objects are accomplished by any of several related procedures. In one procedure the aldehyde polymer is treated with a refluxing mixture of a carboxylic acid anhydride and pyridine and the recovered product is the aldehyde polymer having a polymer chain which is terminated at each end with a carboxylate group corresponding to the carboxylic acid anhydride reactant. In another procedure the aldehyde polymer is treated with a hydrocarbon solution of an orthoester, such as trimethyl orthoformate, and boron trifluoride as a catalyst, and after heating the solution to 20–100° C. for a few minutes there is recovered the aldehyde polymer having a polymer chain terminated at each end by an ether group, such as —OCH$_3$.

The aldehyde polymer used as a starting material has the general formula:

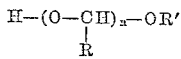

where R is an alkyl group of 1–9 carbon atoms, R' is hydrogen or an organic group such as alkyl, cycloalkyl, aryl, alkane carbonyl, cycloalkane carbonyl, or aryl carbonyl, and $n$ is a positive integer such that the number average molecular weight of the polymer is at least 20,000. When this polymer is reacted with an organic carboxylic acid anhydride, the 1 or 2 hydroxyl groups at the ends of the polymer chain are replaced with organic carboxylate groups corresponding to the organic carboxylic acid from which the anhydride is derived. For example, if the starting polymer having the formula:

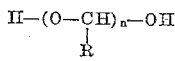

were reacted with acetic acid anhydride, the product polymer would have the formula:

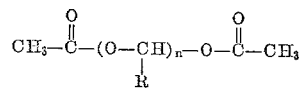

On the other hand, if the same starting polymer were reacted with trimethyl orthoformate, the product polymer would have the formula:

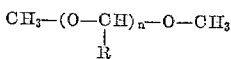

It is to be understood that the starting polymer might have only one of the two ends of the polymer chain terminated by a hydroxyl group, in which event only that one hydroxyl group would be replaced by a carboxylate group or an ether group by the reactions described above. The other end of the polymer chain of such a starting polymer might be terminated with a carboxylate group or an ether group, because of the particular polymerization system employed to prepare the starting polymer, and that terminal group would remain unchanged throughout the above reactions.

The product polymer is characterized by having a reaction rate constant for thermal degradation at 138° C. ($k_{138}$) of less than 1% by weight per minute. The value of the reaction rate constant for thermal degradation as reported herein is determined by placing about 0.5–1 gram of the polymer in a test tube which is fitted with a stopper and an inlet tube and an outlet tube. Nitrogen is passed into the tube for about 5 minutes to displace any air in the tube, following which the tube is maintained at a temperature of 138° C., e.g. by placing the tube in the vapors from boiling p-xylene. While the tube is being heated, a slow stream of nitrogen is continuously passed through the tube to flush out degradation products. After a given period of time, such as 10 minutes to 30 minutes, the tube is removed from the vapor bath, cooled to room temperature by the passage of dry nitrogen through the tube, and the tube and contents are weighed. The tube is then flushed with nitrogen again and placed in the vapor bath again to repeat the cycle of heating, cooling, and weighing. In the determination of the reaction rate constant for thermal degradation at 222° C. ($k_{222}$) the vapor bath may be furnished by boiling methyl salicylate (B.P. 222°–223° C.). The weight of polymer remaining in the test tube after each of these periods of heating is plotted as the logarithm of the weight or weight percent of undegraded polymer as the ordinate versus the corresponding elapsed time since the beginning of degradation as the abscissa. The plotted values usually define a curve which is generally L-shaped, two sections of the curve being lines which are almost straight, and these sections are joined by a sharply changing curve. In some instances, the initial degradation (from 100% undegraded polymer to some value between 90% and 100%), proceeds at a fast rate (possibly greater than 1% per minute), after which the degradation rate assumes a substantially constant value for a considerable portion of the degradation. This latter portion represents the true character of the polymer and is the basis for the reported value of the reaction rate constant, $k$. The graph, therefore, usually shows a first straight-line portion having a steep slope, from 100% to about 90% or 95% undegraded polymer, a second straight-line portion having a much shallower slope than the first portion, and continuing at that slope until substantially all of the polymer is degraded. The second straight-line portion of the graph is the portion from which the value of the reaction rate constant, $k$, is determined, $k$ being 2.303 times the slope of that line. The units of $k$ are reported as weight percent per minute and, therefore, if $k$ has an actual value of 0.01 it is reported as 1%/minute. Although there may be some minor variations in the curves obtained by testing different polymers of different lots of the same polymer, the second straight line portion is always clearly apparent from the graph so that the reaction rate constant is easily calculated by known means. In some instances the second portion of the graph is slightly curved rather than straight, the reason for which is unknown, but in such instances the graph is constructed by drawing the best straight line that will fit the plotted points and determining the $k$ from that straight line.

The product polymer is also characterized by having a number average molecular weight of at least 20,000. It is recognized by those skilled in analytical chemistry that the measurement of number average molecular weight is difficult, and that the values determined by the measurement are not as precise as the results obtained in other areas of analytical chemistry. Even the most precise measurements by methods of osmometry are not sufficiently accurate to provide more than a range of molecular weights which may vary by several thousand in value from the upper to the lower limit of the range. In the description of this invention it is believed that the reported molecular weights are considerably more accurate for the lower molecular weights than for the higher molecular weights.

Number average molecular weights are normally measured by the conventional procedures of osmometry where the polymer is soluble and sufficiently stable. Other methods which have been used in some of the following examples include measurements of inherent viscosity which are transposed by means of a correlation into molecular weight, and a determination of molecular weight by the use of an infrared analysis. The inherent viscosity procedure involves the establishment of a graphical or mathematical correlation of viscosity and molecular weight.

Infrared analysis techniques are also satisfactory for measuring molecular weight. The oxyalkylidene (or aldehyde) content may be measured in infrared absorbance units, and, likewise, the hydroxyl content and/or the carbonyl content may be determined. By knowing the kind and the number of terminal groups on each polymer chain, the infrared analysis permits a calculation of number average molecular weight. By comparison with infrared analyses of polyoxymethylenes of known number average molecular weight, it is possible to approximate the number average molecular weight of the polyaldehydes of this invention. The relative intensities of absorbances of the carbonyl groups terminating the polymer chain afford a correlation of the number of such groups per monomer unit in the polymer. From such a correlation the number average molecular weight can be calculated. This is an excellent approximation because the well-established relationships between infrared analytical data and osmometry measurements on polyoxymethylene can be applied to the polyoxyalkylidenes showing the same intensity of absorbance for the carbonyl band which is located at 5.72 microns for the polyoxyalkylidenes of this invention and at 5.69 microns for polyoxymethylenes. The measurement of carbonyl by infrared analysis, is quite accurate because there is substantially no interference by background absorbance at this wave length, and because the carbonyl band is quite intense. All infrared analyses in this invention were made on a Perkin-Elmer Model 21 Spectrophotometer fitted with a calcium fluoride or a sodium chloride prism. The analyses were made in the region of 2 to 8 microns wave length, the hydroxyl band appearing at 2.88 microns and the carbonyl band at 5.72 microns.

The following examples illustrate certain embodiments of this invention. Parts and percentages are based on weight unless otherwise specified.

EXAMPLES 1–6

In each of these examples the indicated aldehyde was polymerized in a hydrocarbon solvent at about −75° C. in the presence of an alkali metal alcoholate catalyst as described generally in my copending patent application Serial Number 755,415, filed August 18, 1958, now abandoned. At the end of the polymerization reaction there was added to the polymerization medium containing the polymer the indicated amount of organic carboxylic acid anhydride and pyridine in a volume ratio of 4 parts of anhydride per part of pyridine. The temperature was then raised to room temperature and the hydrocarbon used as the polymerization medium (e.g. propylene or pentane) was distilled off. The remaining mixture was then boiled for 40 minutes, cooled, filtered, and the solid polymer washed with acetone. In the following table the results of these examples are reported. The product polymers of Examples 5 and 6 were pressed into smooth films, spun into filaments, and molded into test bars. The melting points are determined by the copper block melting point method.

*Table 1*

| Example | Monomer unit | Amount of monomer used in polymerization (ml.) | Amount of organic carboxylic acid anhydride and pyridine added in volume ratio of 4:1 (ml.) | Reaction time at boiling point (min.) | Yield of polymer (gm.) | Melting point, °C. |
|---|---|---|---|---|---|---|
| 1 | Propionaldehyde | 80 | 320 | 7 | 10 | |
| 2 | n-Butyraldehyde | 100 | 400 | 40 | 30.6 | 225°. |
| 3 | n-Butyraldehyde | 50 | 1 250 | 10 | 10 | 225°. |
| 4 | Isobutyraldehyde | 50 | 250 | 10–15 | 16 | Above 260°. |
| 5 | n-Valeraldehyde | 80 | 350 | 10 | 31.3 | Appx. 155°.[2] |
| 6 | n-Heptaldehyde | 40 | 250 | 7 | 12 | Appx. 150°.[2] |

[1] Propionic acid anhydride used in Example 3, acetic acid anhydride used in all other examples.
[2] In the case of n-valeraldehyde polymer a softening point at about 85° C., and in the case of n-heptaldehyde a softening point at about 70° C., was exhibited by the polymer.

These polymer products were tested to determine their reaction rate constant for thermal degradation at 138° C. during the periods of 0–50 minutes and 200–400 minutes after the beginning of the test. The following results were obtained and compared to that of a polyacetaldehyde which had not been treated with an hydride. The untreated control exhibited a $k_{138}$ of 2.5% to 9.5% and the sample was completely degraded before the end of 50 minutes.

*Table 2*

| Example | $k_{138}$, percent | |
|---|---|---|
| | 0–50 min. | 200–400 min. |
| 1 | 0.94 | 0.13 |
| 3 | 0.32 | 0.082 |
| 4 | 0.092 | 0.047 |
| 5 | 0.064 | 0.023 |
| 6 | 0.018 | 0.018 |

Similar results were obtained by isolating the polyaldehyde before treating it with the acid anhydride and pyridine, and the treatment with acid anhydride and pyridine was successful at refluxing temperatures or at temperatures of 20°–110° C.

EXAMPLES 7–10

In each of these examples, except for Example 10, a slurry of n-butyraldehyde polymer in its polymerization medium was treated with an orthoester and an acid catalyst (boron trifluoride-etherate) in order to replace terminal hydroxyl groups on the polymer chain with terminal alkyl ether groups. In Example 10 a polymer of n-heptaldehyde was employed. The polymer was prepared by the processes described in my copending patent application Serial Number 755,415, filed August 18, 1958, now abandoned, employing 50 ml. of n-butyraldehyde (n-heptaldehyde in Example 10) in a polymerization medium of 250 ml. of propylene, containing as a catalyst 5 ml. of 0.1 N solution of an alkali metal alcoholate in toluene. After polymerization was terminated a mixture of an orthoester and boron trifluoride/dimethyl ether as a catalyst was added to the polymerization medium at about −75° C. The medium was then permitted to warm up to room temperature to evaporate the propylene, following which the remaining mixture was heated to 20°–100° C. for about 10 minutes. The polymer particles were then filtered, washed and dried, and finally dissolved in a mixture of benzyl alcohol/tri-n-propylamine to remove polymer which failed to react with the orthoester in the previous step. The remaining polymer was precipitated, filtered, washed, and dried. The results are shown in the following table.

*Table 3*

| Example | Orthoester employed | Amount of orthoester, ml. | Amount of catalyst | Reaction temp., °C. | Reaction time, min. | Yield of etherified polymer, gm. |
|---|---|---|---|---|---|---|
| 7 | Trimethyl orthoformate | 200 | 0.11 ml | 75 | 10 | 1.92 |
| 8 | Trimethyl orthoacetate | 200 | 4 drops | 96 | 10 | 0.42 |
| 9 | Triethyl orthoacetate | 200 | ----do---- | 95 | 10 | 1.95 |
| 10 | Trimethyl orthoformate | 200 | 6 drops | (¹) | (²) | 1.3 |

¹ Room temp.
² Time to reach room temp.

The reaction rate constant for thermal degradation at 138° C. and at 222° C. was measured on these products; a typical result being that measured on the product of Example 7 above:

By weight/min.
$k_{138}$ (0–50 min.) _____ 0.078
$k_{138}$ (200–400 min.) _____ 0.0057
$k_{222}$ (0–50 min.) _____ 0.42
$k_{222}$ (200–400 min.) _____ 0.104

EXAMPLE 11

The same procedure as specified for Example 7–10 was employed except that the orthoester and the $BF_3$-etherate catalyst were replaced by 200 ml. of methylal and 3 drops of sulfuric acid as a catalyst. The reaction was complete in the time it took to warm the mixture up to room temperature (20° C.) from −75° C. After treatment with benzyl alcohol/tri-n-propylamine the recovered etherified poly(n-butyraldehyde) amounted to 0.11 gram, and it exhibited a reaction rate constant for thermal degradation at 138° C. similar to that reported in Examples 7–10.

The starting polymer of this invention is that which is described in my copending application Serial Number 755,415, filed August 18, 1958. This polymer has at least one of the two ends of its polymer chain terminated with a hydroxyl group, the polymer has a number average molecular weight of at least 20,000, and the polymer is crystalline as determined by X-ray analysis.

The starting polymer is, according to the processes of this invention, subjected to a reaction which changes the one or two hydroxyl groups at the terminals of the polymer chain into ester groups or ether groups. The presence of either of these groups imparts a high degree of thermal stability to the polyaldehyde, which would not be present, if hydroxyl groups were at the terminals of the polymer chain.

The esterification reaction takes place by treating the starting polymer with an anhydride of an organic carboxylic acid having 2–18 carbon atoms per molecule and, as a catalyst, a tertiary amine. The desired proportions of anhydride and amine are such that 0.1–20 parts by weight of anhydride are used per part of polymer, and 1–100 mol percent of amine, based on the anhydride, are employed. The anhydrides which are operable in the processes of this invention include any anhydride of an organic carboxylic acid, whether it be saturated or unsaturated, substituted or unsubstituted with non-functional groups, although the monofunctional anhydrides of the organic carboxylic acids having 2–18 carbon atoms per molecule are preferred. Thus, anhydrides having functional groups, such as hydroxyls, or having olefinic linkages are not preferred, although they are operable to some extent. On the other hand, alkyl- or aryl-substituted anhydrides are acceptable, and mixed anhydrides, such as acetic-propionic anhydride, are also acceptable. The anhydrides of any aliphatic monocarboxylic acid having 2–18 carbon atoms are preferred, such as acetic, propionic, butyric, valeric, caproic, enanthic, caprylic, pelargonic, capric, hendecanoic, lauric, tridecanoic, myristic, pentadecanoic, palmitic, margaric, and stearic. The anhydrides of olefinic acids such as maleic, acrylic, linoleic, and oleic are operable, but not preferable.

The tertiary amine which is employed as a catalyst for the esterification reaction may be alkyl, cycloalkyl, or aryl. For example, the following tertiary amines, among others known to skilled chemists, are operable in the processes of this invention: trimethylamine, triethylamine, tripropylamine, tributylamine, dimethylcyclohexylamine, diethylcyclohexylamine, quinoline, pyridine, methylethylpyridine, dimethylaniline, and N-phenylmorpholine.

The etherification reaction takes place by treating the starting polymer with a mixture of an orthoester and an acid catalyst. The amount of orthoester, generally, is from 0.25 to 1000 parts by weight per part of polymer, although in most instances 1 to 100 parts are sufficient, and, therefore, this constitutes the preferred range. The amount of acid catalyst preferably varies from 0.01%–0.5% by weight of the orthoester employed. More than about 1.0% by weight of the catalyst is deleterious because it degrades the polymer.

The orthoester which is used to change hydroxyl groups to ether groups has the general formula:

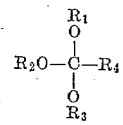

where $R_1$, $R_2$, and $R_3$ are alkyl groups of 1–4 carbon atoms and $R_4$ is hydrogen or an alkyl group of 1–4 carbon atoms. Thus, the orthoesters comprehended in this invention, include, for example, trimethyl orthoformate, trimethyl orthoacetate, trimethyl orthopropionate, trimethyl orthobutyrate, trimethyl orthovalerate, and the triethyl-, tripropyl-, and tributyl-derivatives of the same orthoesters.

The acid catalyst which is employed in the process of this invention is a "Lewis acid," which has been defined as a compound capable of donating protons or accepting electrons. The preferred catalysts of this process are of the Friedel-Crafts type, e.g. boron trifluoride, aluminum trichloride, tin tetrabromide, and titanium tetrachloride. These catalysts are preferably used in the form of a complex with ether, such as boron trifluoride-etherate, the ether being any lower alkyl ether, such as dimethyl ether or diethyl ether.

The reaction conditions for the esterification or etherification of the starting polymer are moderate. The temperatures vary from about room temperature (20° C.) to about 150° C. The pressure of the reaction is not critical and may be atmospheric. The time of the reaction is not critical and may be atmospheric. The time of the reaction is generally about 10 minutes to 1 hour.

Because the starting polymer of this invention is made from an aldehyde having at least two carbon atoms, the polymer is much less receptive to esterification or etherification than a polyoxymethylene. This is because the terminal hydroxyl groups of the polymer of this invention function similarly to a secondary alcohol while those of polyoxymethylene function as a primary alcohol, the latter being much more reactive than the former. Accordingly, the reactants and reaction conditions are more limited and critical than those for the esterification, or etherification of polyoxymethylene glycol. As an example of this statement, the polymers used in the present invention are not susceptible to esterification by a vapor process or a solution process, nor are these polymers able to tolerate more than small amounts of acid, because the rate of degradation under such conditions is much faster than the rate of esterification or etherification.

The reaction is conducted with the polymer slurried in the liquid mixture of the anhydride and the catalyst. This slurry may be formed by adding dry, or substantially dry, starting polymer to a liquid mixture of anhydride and tertiary amine catalyst, or the latter two components may be added to the system in which the polymer has been prepared, and the system heated to remove the polymerization reaction medium and leave the polymer slurried in the mixture of anhydride and amine. In any event it is usually desirable to provide enough anhydride and amine to produce a slurry which is thin enough to be agitated easily. The weight proportions of solid polymer to liquid may vary from about 1:1 to about 1:1000 although from about 1:5 to about 1:100 are preferable limits.

The product of this invention is useful as a thermoplastic material eminently well suited for the fabrication of all kinds of shaped articles, e.g. films, fibers, filaments, bristles, pipes, rods, tubes, and other extruded shapes or molded articles.

I claim:

1. A thermally stable, crystalline polyaldehyde having the general formula

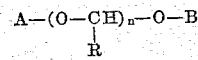

where R is an alkyl radical of 1–9 carbon atoms, $n$ is a positive integer such that the number average molecular weight of the said polyaldehyde is at least 20,000, and A and B are monovalent radicals having 1–10 carbon atoms and being selected from the group consisting of alkyls and alkane carbonyls, said polyaldehyde exhibiting a reaction rate constant for thermal degradation at 138° C. of less than 1% by weight per minute.

2. A thermally stable, thermoplastic, crystalline addition polymer of a saturated, unsubstituted, aliphatic aldehyde having 2–10 carbon atoms per molecule, said polymer having a polymer chain which is terminated by an —OR group at each end of said chain, R being an alkyl of 1–10 carbon atoms; said polymer being characterized by having a number average molecular weight of at least 20,000 and by exhibiting a reaction rate constant for thermal degradation at 138° C. of less than 1% by weight per minute.

3. A process for preparing a thermally stable, esterified, crystalline polyaldehyde comprising forming a mixture of (1) the anhydride of an organic carboxylic acid having 2–18 carbon atoms per molecule, (2) a tertiary amine, and (3) a preformed, crystalline polyaldehyde having the formula:

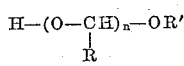

wherein R is an alkyl group of 1–9 carbon atoms, R' is selected from the group consisting of hydrogen, alkyl, cycloalkyl, aryl, alkane carbonyl, cycloalkane carbonyl, and aryl carbonyl, and $n$ is a positive integer such that the number average molecular weight of the said preformed, crystalline polyaldehyde is at least 20,000; heating said mixture to a temperature of 20°–150° C. and recovering a thermally stable, esterified, crystalline polyaldehyde characterized by having a structure which differs from the above formula only to the extent that each hydroxyl group originally present in said preformed, crystalline polyaldehyde is replaced by a carboxylate group corresponding to said organic carboxylic acid.

4. A process for preparing a thermally stable, etherified, crystalline polyaldehyde comprising forming a mixture of (1) a trialkyl orthocarboxylate, (2) a strong acid catalyst, and (3) a preformed, crystalline polyaldehyde having the formula:

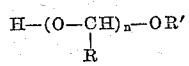

wherein R is an alkyl group of 1–9 carbon atoms, R' is selected from the group consisting of hydrogen, alkyl, cycloalkyl, aryl, alkane carbonyl, cycloalkane carbonyl, and aryl carbonyl, and $n$ is a positive integer such that the number average molecular weight of said preformed, crystalline polyaldehyde is at least 20,000; heating said mixture at a temperature of 20°–100° C., and recovering a thermally stable, etherified, crystalline polyaldehyde characterized by having a structure which differs from the above formula only to the extent that each hydroxyl group originally present in said preformed, crystalline polyaldehyde is replaced by an alkyl ether group corresponding to the alkyl of said trialkyl orthocarboxylate.

References Cited by the Examiner

UNITED STATES PATENTS 3,001,966  9/61  Funck et al. _____ 260—67

FOREIGN PATENTS 214,650  4/61  Australia.
696,105  8/53  Great Britain.
770,717  3/57  Great Britain.

OTHER REFERENCES

Rigby et al.: J. Chem. Soc., February 1948, pages 234–7.

Bevington et al., Proc. of the Royal Soc. (London), vol. A186 (1949), pp. 363–378.

WILLIAM H. SHORT, Primary Examiner.

H. N. BURSTEIN, MILTON STERMAN, Examiners.